United States Patent
Li

(10) Patent No.: US 8,452,145 B2
(45) Date of Patent: May 28, 2013

(54) TRIPLE-CLAD OPTICAL FIBERS AND DEVICES WITH TRIPLE-CLAD OPTICAL FIBERS

(75) Inventor: Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 677 days.

(21) Appl. No.: 12/711,671

(22) Filed: Feb. 24, 2010

(65) Prior Publication Data
US 2011/0205349 A1  Aug. 25, 2011

(51) Int. Cl.
*G02B 6/036* (2006.01)
(52) U.S. Cl.
USPC .......................... 385/128; 385/126; 385/127
(58) Field of Classification Search
None
See application file for complete search history.

(56) References Cited

U.S. PATENT DOCUMENTS

| | | | |
|---|---|---|---|
| 7,570,857 B1 * | 8/2009 | Bickham et al. | 385/127 |
| 2003/0063878 A1 | 4/2003 | Matsuo et al. | |
| 2007/0213618 A1 * | 9/2007 | Li et al. | 600/476 |
| 2008/0304800 A1 * | 12/2008 | Bickham et al. | 385/127 |
| 2010/0021114 A1 | 1/2010 | Chen et al. | |

FOREIGN PATENT DOCUMENTS

| | | |
|---|---|---|
| EP | 1722256 | 11/2006 |
| GB | 2379279 | 3/2003 |
| WO | 2004/070897 | 8/2004 |

OTHER PUBLICATIONS

"Fiber-optic scanning two-photon fluorescence endoscope" by Myaing et al; Optics Letters, vol. 31, No. 8, Apr. 15, 2006; p. 1076-1078.

* cited by examiner

*Primary Examiner* — Uyen Chau N Le
*Assistant Examiner* — Chad Smith
(74) *Attorney, Agent, or Firm* — Svetlana Z. Short

(57) ABSTRACT

According to some embodiments the triple-clad optical fiber comprises a core, a first inner cladding, a second inner cladding, and an outer cladding wherein: (i) the core comprises a radius $r_0$ a first index of refraction $n_0$; (ii) the first inner cladding surrounds the core and has a numerical aperture of at least about 0.12, and a second index of refraction $n_1$ such that $n_1 < n_0$, (iii) the second inner cladding surrounds the first inner cladding a numerical aperture of at least about 0.2, and a second index of refraction $n_2$ such that $n_2 > n_1$, wherein a relative refractive index percent ($\Delta\%$) of the second cladding relative to the outer cladding is greater 1%; and (iv) the outer cladding surrounds the second inner cladding and has a third index of refraction $n_3$ such that $n_3 < n_2$, and $n_3 < n_1$.

17 Claims, 4 Drawing Sheets

(a)

(b)

TRIPLE-CLAD OPTICAL FIBERS AND DEVICES WITH TRIPLE-CLAD OPTICAL FIBERS

BACKGROUND

1. Field

The present invention relates to triple-clad optical fibers and devices utilizing triple-clad optical fibers and, more specifically, to triple-clad optical fibers having an inner cladding with a high numerical aperture and endoscopes utilizing such triple-clad optical fibers.

2. Technical Background

Endoscopes, specifically non-linear optical endoscopes utilizing two-photon fluorescence processes have emerged as one of the best, non-invasive means of performing fluorescence microscopy on a sample and/or a subject. The non-linear optical endoscopes utilize a source or excitation laser beam directed onto a target with an optical fiber. The interaction of the excitation laser beam with the target causes the target material to fluoresce or emit light due to two photon absorption, which is collected back into the endoscope with the optical fiber for further analysis, imaging, spectroscopy and the like. Compared with single-photon microscopy, two-photon fluorescence microscopy offers inherent optical sectioning properties, greater penetration depths and flexible optical spectra accessibility.

One of the key components of non-linear optical endoscopy utilizing the two-photon fluorescence process is the optical fiber employed in the endoscope. While standard single mode optical fiber may be utilized in the endoscope to deliver the excitation laser beam to the target of interest, these optical fibers are not suitable for collecting the optical signals emitted by the target back into endoscope for further analysis, image formation, spectroscopy and the like. This is primarily due to the low numerical aperture and small core size of standard single mode fibers which limits the collection efficiency of the optical fibers.

To improve the collection efficiency of the non-linear optical endoscope, double-clad optical fibers may be used. Such optical fibers generally include a core, an inner cladding, and an outer cladding. The excitation beam of the endoscope is delivered to the target via the core of the optical fiber and the light emitted from the target is collect back into the endoscope via the inner cladding of the optical fiber. To have high collection efficiency, a high numerical aperture of the inner cladding is desired. The numerical aperture can be increased by doping the inner cladding with an index raising dopant. In this case, the core has to be up-doped with a higher doping level (Ge or Al) to create a waveguide in the core. However doping the fiber core of the double-clad fiber with high concentration of dopant (while having an up-doped inner cladding) will increase the background noise. In endoscope applications, it is desirable to collect the two-photon signal with low noise background. To reduce the background noise, one can use a double clad fiber that has a core with low up-dopant levels, and the inner cladding that is pure silica or doped with an index decreasing dopant, to create a waveguiding structure. However, the lower refractive index in the inner cladding reduces the NA of the inner cladding, which decreases the collection efficiency of the double clad fiber. Thus one of skill in the art, in designing double-clad fibers for endoscope applications, typically has to emphasize either a good collection efficiency or a low background noise.

Therefore, there is a need to design a fiber with low dopant levels in the core but with high numerical aperture in the cladding to increase the collection efficiency in the cladding.

Accordingly a need exists for alternative optical fibers and non-linear optical endoscopes employing the same.

SUMMARY OF THE INVENTION

In some embodiments a triple-clad optical fiber comprising: a core, a first inner cladding, a second inner cladding, and an outer cladding wherein, (i) the core comprises a radius $r_0$ and a first index of refraction $n_0$; (ii) the first inner cladding surrounds the core and has a numerical aperture of at least about 0.12, and a second index of refraction $n_1$ such that $n_1<n_0$, (iii) the second inner cladding surrounds the first inner cladding, and has a numerical aperture of at least about 0.2, and a second index of refraction $n_2$ such that $n_2>n_1$, wherein a relative refractive index percent ($\Delta\%$) of the second cladding relative to the outer cladding is greater 1%; and (iv) the outer cladding surrounds the second inner cladding and has a third index of refraction $n_3$, such that $n_3<n_2$, and $n_3<n_1$.

In some embodiments, the triple-clad optical fiber includes a core, a first inner cladding, a second inner cladding, and an outer cladding, all made of silica-based glass. The core may have a radius $r_0$ of less than about 5 μm, and an index of refraction $n_0$, and does not contain any active (rare-earth) dopants. The first inner cladding may surround the core and includes a radial thickness of at least about 5 μm, a numerical aperture of at least about 0.12 (and preferably at least 0.14), and a index of refraction $n_1$ such that $n_1<n_0$. The relative refractive index percent ($\Delta\%$) of the core relative to the inner cladding may be greater than about 0.07%, and in some embodiments greater than 0.1%. The second inner cladding may surround the inner cladding and includes a radial thickness of at least about 10 μm, a numerical aperture of at least about 0.2 (and in some embodiments >0.25), and a index of refraction $n_2$ such that $n_2>n_1$. The outer cladding may surround the second inner cladding and include a radial thickness from about 10 μm to about 50 μm and an index of refraction $n_3$ such that $n_3<n_2$. The relative refractive index percent ($\Delta\%$) of the inner claddings relative to the outer cladding may be greater than about 1.5%.

In another embodiment, a non-linear optical endoscope may include a laser source, a triple-clad optical fiber, a beam scanning unit, an optical detector and a computer. The triple-clad optical fiber includes a core, a first inner cladding, a second inner cladding and an outer cladding of silica-based glass. The core may have a radius $r_0$ of less than about 5 μm, an index of refraction $n_0$ and does not contain any active rare-earth dopants. The first inner cladding may surround the core and includes a radial thickness of at least about 5 μm, a numerical aperture of at least about 0.12, and a index of refraction $n_1$ such that $n_1<n_0$. The relative refractive index percent ($\Delta\%$) of the core relative to the inner cladding may be greater than about 0.07% or even greater than 0.1%. The second inner cladding may surround the inner cladding and includes a radial thickness of at least about 10 μm, a numerical aperture of at least about 0.2, and a index of refraction $n_2$ such that $n_2>n_1$. The outer cladding may surround the second inner cladding and include a radial thickness from about 10 μm to about 50 μm and an index of refraction $n_3$ such that $n_3<n_2$. The relative refractive index percent ($\Delta\%$) of the inner claddings relative to the outer cladding may be greater than about 1.5%. An output of the laser source may be optically coupled to the core of the triple-clad optical fiber at a first end of the triple-clad optical fiber such that the output of the laser source is directed into the core of the triple-clad optical fiber. The optical detector may be coupled to the inner cladding of the triple-clad optical fiber at the first end of the triple-clad optical fiber and may be operable to convert light traveling through the inner cladding into electrical signals. The computer may be electrically coupled to the optical detector and operable to form an image from electrical signals received by the optical detector. The beam scanning unit may be optically coupled to a second end of the optical fiber and may be operable to scan the output of the laser source directed into the core of the triple-clad optical fiber across a target in two dimensions and collect light emitted from the target into the inner cladding of the triple-clad optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

Figure 1A:
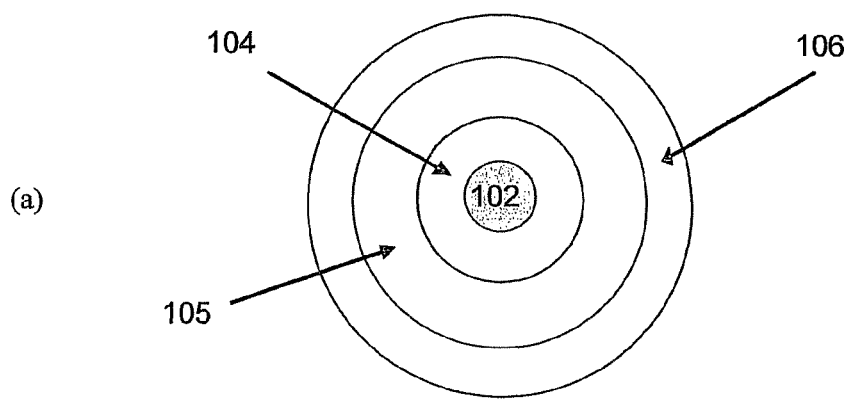
FIG. 1A depicts schematically a cross section of an optical fiber according to one or more embodiments shown and described herein.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

DETAILED DESCRIPTION OF THE PREFERRED EMBODIMENTS

The following definitions and terminology are used herein:

Refractive index profile is the relationship between the relative refractive index ($\Delta\%$) and the radius of the optical fiber, as measured from the centerline of the optical fiber, over a selected portion of the fiber;

Relative refractive index percent or delta percent ($\Delta\%$) is defined as:

$$\Delta\% = 100\frac{(n_i^2 - n_{ref}^2)}{2n_i^2},$$

where $n_i$ is the maximum refractive index in region i, and $n_{ref}$ is the index of refraction of the reference region, unless otherwise specified herein;

Mode field diameter (MFD) is a measure of the spot size or beam width of light propagating in a single mode fiber. Mode-field diameter is function of the source wavelength, fiber core radius and fiber refractive index profile. MFD is measured using the Peterman II method where $$MFD = 2w,$$

and $$w^2 = 2\frac{\int_0^\infty E^2 r\,dr}{\int_0^\infty (dE/dr)^2 r\,dr}$$

where E is the electric field distribution in the fiber and r is the radius of the fiber;

Chromatic dispersion or dispersion of a fiber is the sum of the material dispersion, the waveguide dispersion, and the inter-modal dispersion. In the case of single mode waveguide fibers the inter-modal dispersion is zero.

The effective area of a fiber is the area of the fiber in which light is propagated and is defined as:

$$A_{eff} = 2\pi\frac{\left(\int_0^\infty E^2 r\,dr\right)^2}{\int_0^\infty E^4 r\,dr},$$

where E is the electric field associated with light propagated in the fiber and r is the radius of the fiber.

The cutoff wavelength is the minimum wavelength at which an optical fiber will support only one propagating mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The fiber cutoff wavelength will be lower than the theoretical cutoff wavelength and is measured using a transmitted power technique such as the technique described in TIA-455-

80B entitled "Measurement Cut-off Wavelength of Uncabled Single-mode Fiber By Transmitted Power. To avoid interference between light propagating in the core region and light propagating in the inner cladding regions of the triple-clad optical fiber, a launch fiber is used to direct the light source into the core of the triple-clad -clad optical fiber. The launch fiber has a cutoff wavelength slightly greater than the expected core fiber cutoff wavelength of the triple-clad optical fiber. The length of the launch fiber should be greater than 2 meters. The core size of the launch fiber is approximately the same as the core size of triple-clad -clad optical fiber. In the measurement, the launch fiber is carefully aligned to the triple-clad -clad fiber to ensure an efficient coupling between the core of the launch fiber and a core of the triple-clad e-clad optical fiber.

All wavelength-dependent optical properties (such as dispersion, cutoff wavelength, etc.) are reported herein for the wavelength specified.

It should be understood that $\Delta_o\%$, as used herein, refers to the relative refractive index percent ($\Delta\%$) of the core of the triple-clad optical fiber relative to the first inner cladding of the triple-clad optical fiber. Accordingly, $$\Delta_0\% = 100\frac{(n_0^2 - n_1^2)}{2n_0^2},$$

where $n_0$ is the index of refraction of the core and $n_1$ is the index of refraction of the first inner cladding.

It should be understood that $\Delta_1\%$, as used herein, refers to the relative refractive index percent ($\Delta\%$) of the first inner cladding of the triple-clad optical fiber relative to the outer cladding of the triple-clad optical fiber. Accordingly, $$\Delta_1\% = 100\frac{(n_1^2 - n_3^2)}{2n_1^2},$$

where $n_1$ is the index of refraction of the first inner cladding and $n_3$ is the index of refraction of the outer cladding.

It should be understood that $\Delta_2\%$, as used herein, refers to the relative refractive index percent ($\Delta\%$) of the second inner cladding of the triple-clad optical fiber relative to the outer cladding of the triple-clad optical fiber. Accordingly, $$\Delta_2\% = 100\frac{(n_2^2 - n_3^2)}{2n_2^2},$$

where $n_2$ is the index of refraction of the second inner cladding and $n_3$ is the index of refraction of the outer cladding.

FIG. 1A shows a triple-clad optical fiber according to one embodiment shown and described herein. The triple-clad optical fibers described herein generally comprise a core 102, a first cladding (also refereed herein as the first inner cladding) 104, a second cladding (also refereed herein as the second inner cladding) 105, and an outer (third) cladding 106. The second inner cladding 105 surrounds the first inner cladding 104 and has a high numerical aperture. The material of the outer cladding and the second inner cladding are selected such that the indices of refraction of the outer cladding and the second cladding yield a second inner cladding with a high numerical aperture. According to some embodiments, the outer cladding is silica based glass that is doped at least with F. The core, inner claddings and outer cladding generally comprise silica, specifically silica glass. According to at least some embodiments, the fiber has attenuation of less than 1 dB/km at the wavelength range of 1060 to 1700 nm.

The structure, composition, methods of manufacture, characteristics and devices utilizing the triple-clad optical fibers will be described and discussed in more detail herein.

Figure 1B:
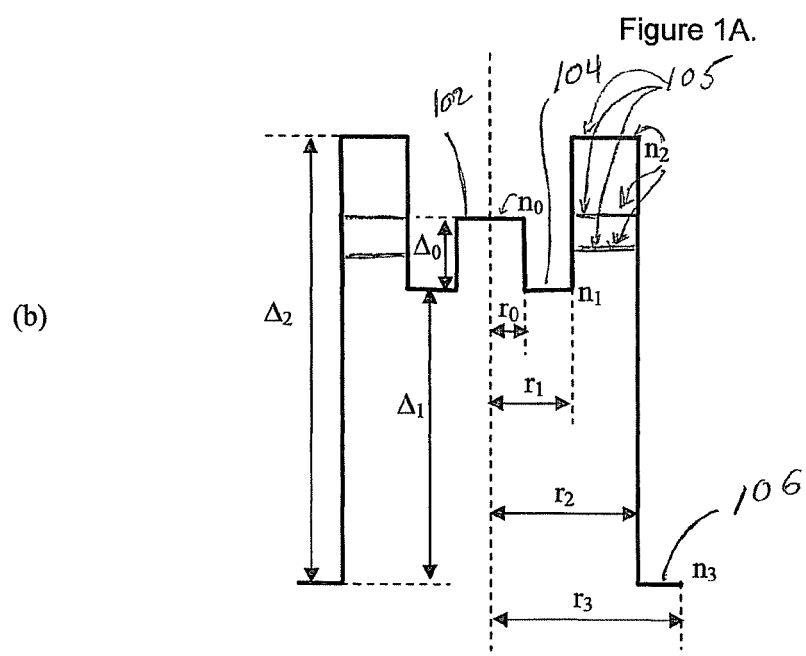
FIG. 1B depicts schematically the refractive index profile of the optical fiber of FIG. 1A according to one or more embodiments shown and described herein.
Figure 2:
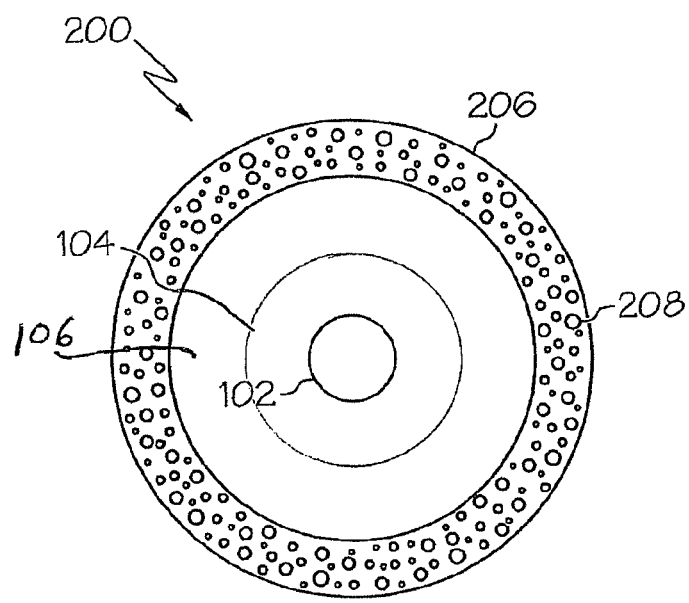
FIG. 2 depicts schematically a cross section of a triple-clad optical fiber comprising a random distribution (both size and position) of voids in the outer cladding according to one or more embodiments shown and described herein.

According to some embodiments, the fiber core 102 has a refractive index $n_0$. It can be made of glass doped with an index raising dopant such Ge or Al to increase the index, or can be made of pure silica. The first inner cladding 104 has a refractive index $n_1 < n_0$. It can be made of pure silica glass, or glass doped with an index decreasing dopant such as F, or B. According to some embodiments a relative refractive index change of core to the first inner cladding ($\Delta_0$) is in the range of 0.1-2%. According to some embodiments the core radius $r_0$ is in the range of 2-10 µm. The outer radius $r_1$ of the first inner cladding is preferably greater than 5 times of the core radius $r_0$ to provide low tunneling loss of the light guided in the core 102. According to some embodiments the refractive index delta of the first inner cladding relative to the outer cladding ($\Delta_1$) is preferably between 0.5 to 1.5%. The second inner cladding 105 has a refractive index of $n_2 > n_1$. It can be made of glass doped with an index raising dopant such as Ge, Al, or Ti. The outer cladding 106 has a refractive index $n_3 < n_2$. It can be made of glass doped with an index decreasing dopant such as B, F, or both. The relative index change of the second inner cladding relative to the outer cladding, $\Delta_2$ is preferably greater than 1.5%, which corresponds to a NA of greater than 0.25. The preferred total thickness of the inner claddings (first+second inner claddings) is between 25-500 µm, depending on the application. The thickness of the outer cladding is preferably between 10-50 µm. In a two-photon microscopy using a triple-clad fiber 100 as shown in FIGS. 1A, 1b and 2, the pump light is guided in the core and delivered to the target, while the optical signal after interaction with the target is collected by the inner claddings. The core 102 is preferably single mode at the pump wavelength to ensure a good beam quality. The second inner cladding 105 preferably to has a high numerical aperture and large dimension to enable a high capture efficiency of the signal.

Referring now to FIGS. 1A and 1B, a cross section of a triple-clad optical fiber 100 and the corresponding refractive index profile is shown according to one embodiment described herein. The triple-clad optical fiber 100 of FIG. 1A comprises a core 102, a first inner cladding 104, a second inner cladding 105, and an outer cladding 106. In the embodiment shown, the core 102, the first inner cladding 104, a second inner cladding 105, and the outer cladding 106 generally comprise silica, specifically silica glass. In one embodiment (not shown) one or more protective coatings may surround the outer cladding 106. In the embodiments shown herein, the cross section of the triple-clad optical fiber may be generally circular-symmetric with respect to the center of the core although it should be understood that the optical fibers and individual layers of the optical fiber (e.g., the core, the inner cladding, and the outer cladding) may have other geometrical configurations. When the triple-clad optical fiber 100 is circular-symmetric as shown in FIG. 1A, the outer diameter (e.g., $2r_3$) of the triple-clad optical fiber 100 may be from about 120 µm to about 500 µm, more preferably 125 µm to about 300 µm and, most preferably, 125 µm to about 250 µm.

In the embodiment shown in FIG. 1A, the core 102 of the triple-clad fiber may have a first index of refraction $n_0$. The core 102 may comprise pure silica ($SiO_2$) or, alternatively, the core 102 may preferably comprise a relatively small amount of one or more index of refraction raising dopants such as, for example, $GeO_2$, $Al_2O_3$, $P_2O_5$, $TiO_2$, $ZrO_2$, $Nb_2O_5$ and/or $Ta_2O_5$, such as when the core is "up-doped." In the embodiments and examples discussed herein, the core 102 may contain from about 0 wt. % to about 20 wt. % $GeO_2$, for example about 0 wt. % to about 10 wt. % $GeO_2$ and, in some exemplary embodiments, 0 wt. % to about 6 wt. % $GeO_2$. Alternatively, in the embodiments and examples discussed herein, the core 102 may contain from about 0 wt. % to about 10 wt. % $Al_2O_3$, for example about 0 wt. % to about 8 wt. % $Al_2O_3$ and, in some embodiments, 0 wt. % to about 7 or even 0 wt% to 4 wt. % of $Al_2O_3$.

The radius $r_0$ of the core 102 may be, for example, from about 1.5 μm to about 5 μm, more preferably from about 2 μm to about 4 μm and, in some embodiments, from about 2.5 μm to about 3.5 μm such that the spot size of light propagating through the core of the triple-clad optical fiber is small with a corresponding high optical power density thereby producing strong non-linear effects if the triple clad optical fiber is used in conjunction with a non-linear optical endoscope. However, the spot size should also be large enough for efficient coupling of a light source to the core of the triple-clad optical fiber. The effective area of the core 102 of the triple-clad optical fiber may be from about 30 μm² to about 120 μm², more preferably from about 50 μm² to about 100 μm².

The relative refractive index percent (Δ%) of the core relative to the first inner cladding (e.g., $\Delta_0$%) may be at least 0.1%, more preferably greater than about 0.2%, and, most preferably, greater than about 0.3%, for example 0.4%, 0.5%, 0.6%, 0.75%, 1%, 1.2 or 1.3%. The numerical aperture NA of the core characterizes the range of angles over which the core may accept or emit an optical signal and is directly related to the refractive indices of the core 102 and the inner cladding 104 (discussed further herein). As used herein, the "numerical aperture of the core" is expressed as:

$$NA_{core} = \sqrt{(n_0^2 - n_1^2)}$$

for a core having an index of refraction $n_0$ and the first inner cladding having an index of refraction $n_1$. Unless otherwise stated, any reference to the numerical aperture of the core or $NA_{core}$ refers to the numerical aperture of the core as determined by the above referenced mathematical relation. In embodiments shown and described herein, the material comprising the core 102 and the inner cladding 104 may be selected such that the numerical aperture NA of the core 102 is preferably from about 0.08 to about 0.25, more preferably about 0.09 to about 0.20 and, most preferably, 0.1 to 0.15. The refractive index profile of the core may be a step profile, as shown in FIG. 1B, a rounded step, or a gradient profile.

In one embodiment, the core 102 may be passive, e.g., the core 102 does not contain any active elements which would enable a gain or lasing action in the core 102. Specifically, the core 102 may be devoid of any rare earth dopants including Yb, Er, Nd, Tm, Sm and Tb. In certain embodiments phosphorous may be added to the core 102 in order to lower the softening temperature of the silica glass in the core 102. This can be particularly advantageous if the core is produced by an inside vapor deposition (IVD) process. Additions of phosphorous may also be utilized to raise the refractive index $n_0$ of the core 102.

In embodiments shown and described herein, the core of the triple-clad optical fiber is single moded at the desired operating wavelength such as, for example, wavelengths of 800 nm, 1060 nm, 1310 nm and 1550 nm. As used herein, single moded means that the core of the triple-clad optical fiber only supports one propagating mode for the particular wavelength of light. Single mode fibers generally have better dispersion characteristics (e.g., lower dispersion) than multi-mode fibers. The fiber cutoff wavelength generally delineates the operating wavelengths for which the triple-clad optical fiber will be single moded with operating wavelengths greater than the cut-off wavelength being suitable for single mode propagation. Thus, it is desirable that the fiber be designed so that the core fiber cutoff wavelength is less than the operating wavelength at which the fiber is intended to be used, e.g. less than 800, 1060, 1310, and/or 1550 nm.

The first inner cladding 104 may have a second index of refraction $n_2$ such that $n_1 < n_0$. The first inner cladding 104 may comprise pure silica glass ($SiO_2$), or silica glass with one or more dopants which decreases the index of refraction such as fluorine or boron, such as when the inner cladding is "down-doped." In one embodiment, the core is Ge doped with less than 6% wt % $GeO_2$ and the first inner cladding 104 is pure silica glass. In another embodiment, the core 102 is a pure silica glass and the first inner cladding 104 may comprise silica glass doped with F in an amount from about 0.5 wt. % to about 2 wt %, for example 0.5 to 1.5 wt %, for example in some embodiments 0.6 wt % to about 1.3 wt. % and, or 0.7 wt. % to about 1.2 wt. %.

The second inner cladding 105 surrounds the first inner cladding 104 and has a refractive index greater than that of the inner cladding (i.e., $n_2 > n_1$). In some embodiments the second inner cladding 105 comprises silica glass doped with $GeO_2$ in an amount from about 5 wt. % to about 40 wt. %, more preferably 20 wt. % to about 40 wt. % (for example, 10 wt %, 15 wt %, 20 wt %, 25 wt %, 30 wt %, 35 wt %, or 40 wt %). In some embodiments the second inner cladding comprises silica glass doped with $TiO_2$ in an amount from about 1 wt. % to about 20 wt. %, more preferably 10 wt. % to about 20. In yet another embodiment, the second inner cladding 105 may comprise silica glass doped with $Al_2O_3$ from about 0 wt % to 18 wt %, for example, 1 wt. % to about 15 wt. %, and, most preferably, from about 5 wt. % to about 10 wt. %. It should be understood that the dopant added to the core 102 need not be the same as the dopant added to the second inner cladding 105. For example, the second inner cladding 105 may comprise silica glass doped with $GeO_2$ while the core may be either pure silica or silica doped with a relatively small amount of $Al_2O_3$.

The thickness of the first inner cladding 104 (e.g., $r_1 - r_0$) may be greater than about 20 μm, for example between 11 μm and 35 μm. Preferably, the ratio $r_1/r_0$ is $\geq 5$ to minimize tinneling induvced loss.

According to at least one embodiment, the "numerical aperture of the first inner cladding" may be calculated using the relationship: $NA_{firstinnercladding} = \sqrt{(n_1^2 - n_3^2)}$, where $n_1$ is the index of refraction of the first inner cladding 104 and $n_3$ is the index of refraction of the outer cladding 106 (discussed further herein). For example, the numerical aperture (NA) of the first inner cladding 104 may be >0.25, or $\geq 0.29$, for example 0.25 to 0.3.

The thickness of the second inner cladding 105 (e.g., $r_2 - r_1$) may be greater than about 10 μm, and in some embodiments greater than 12 or about 14 μm and, for example between about 15 and 175 μm, or between about 15 μm and about 90 μm. The relative refractive index percent (Δ%) of the second inner cladding 105 relative to the outer cladding 106 (e.g., $\Delta_2$ (%)) is greater than about 1.5% which corresponds to a numerical aperture of at least 0.25. The numerical aperture of the second inner cladding characterizes the range of angles over which the first and second inner cladding may accept or emit an optical signal and depends on the mathematical relationship between refractive indices of both the two inner claddings and the outer cladding. According to at least one embodiment, the "numerical aperture of the second inner cladding" may be calculated using the relationship:

$$NA_{secondinnercladding} = \sqrt{(n_2^2 - n_3^2)},$$

where $n_2$ is the index of refraction of the second inner cladding and $n_3$ is the index of refraction of the outer cladding 106 (discussed further herein). For example, for the fiber examples shown in Tables 2A and 2B, the numerical apertures of the inner claddings were theoretically determined using the mathematical relationship defined above. However, the numerical apertures of the inner claddings of the fiber examples shown in Table 1 were experimentally determined using an apparatus and technique that will be discussed further herein. The relative compositions of the second inner cladding 105 and the outer cladding 106 may be selected such that the difference in the refractive indices yields a second inner cladding 105 having the desired numerical aperture. The numerical aperture of the second inner cladding 105 may be greater than about 0.25, more preferably greater than about 0.3 and, most preferably, greater than about 0.35 to maximize the range of angles over which the second inner cladding accepts or emits an optical signal. The refractive index profile of the second inner cladding 105 may be a step profile, as shown in FIG. 1B, a rounded step, or a gradient profile.

The thickness of the outer cladding 106 (e.g., $r_3 - r_2$) may be from about 10 μm to about 50 μm, more preferably about 12.5 μm to about 30 μm and, most preferably, about 15 μm to about 20 μm. The outer cladding 106 may generally have a third index of refraction $n_3$ such that $n_3 < n_2$. Preferably $n_1 > n_3$ and/or $n_0 > n_3$. As noted hereinabove, the material composition of the inner cladding 104 and the outer cladding 106 may be selected such that the differences in the indices of refraction yield the desired numerical aperture for the second inner cladding 105. To achieve a second inner cladding 105 with the desired numerical aperture of greater than about 0.25, the outer cladding 106 may be down-doped relative to the second inner cladding 105 such that the difference between the index of refraction of the outer cladding $n_3$ and the index of refraction of the inner cladding $n_2$ results in the desired numerical aperture for the second inner cladding 105. Alternatively, the second inner cladding 105 may be up-doped with respect to the outer cladding 106 or the second inner cladding 105 may be up-doped with respect to the outer cladding 106 and the outer cladding 106 is down-doped with respect to the second inner cladding 105.

In at least one embodiment, the outer cladding 106 may comprise silica glass with one or more dopants, such as fluorine, boron or combinations thereof, which lower the index of refraction $n_3$ of the outer cladding 106 with respect to the index of refraction $n_2$ of the first and second inner claddings 104, 105 (e.g., the outer cladding 106 is "down-doped"). In one embodiment, the outer cladding 106 may comprise silica glass with less than about 5 wt. % F and less than about 10 wt. % B in the form of $B_2O_3$, more preferably less than about 2.5 wt. % F and less than about 5 wt. % B in the form of $B_2O_3$ and, most preferably, about 2 wt. % F and less than about 5 wt. % B in the form of $B_2O_3$ such that the relative refractive index percent (Δ%) of the inner claddings 104 and 105 relative to the outer cladding 106 (e.g., $\Delta_2\%$) is greater than about 1.5%. When a first inner cladding 104 comprises pure silica glass and the outer cladding 106 comprises silica glass with about 2 wt. % F and about 5 wt. % B, the numerical aperture of the first inner cladding may be about 0.30. In some embodiments, when the second inner cladding 105 contains dopants (e.g., $GeO_2$, $Al_2O_3$ or the like) that increase the index of refraction of the second inner cladding a 105 and the outer cladding 106 comprises silica glass with about 2 wt. % F and about 5 wt. % B, the numerical aperture of the second inner cladding may be greater than about 0.36.

Figure 3:
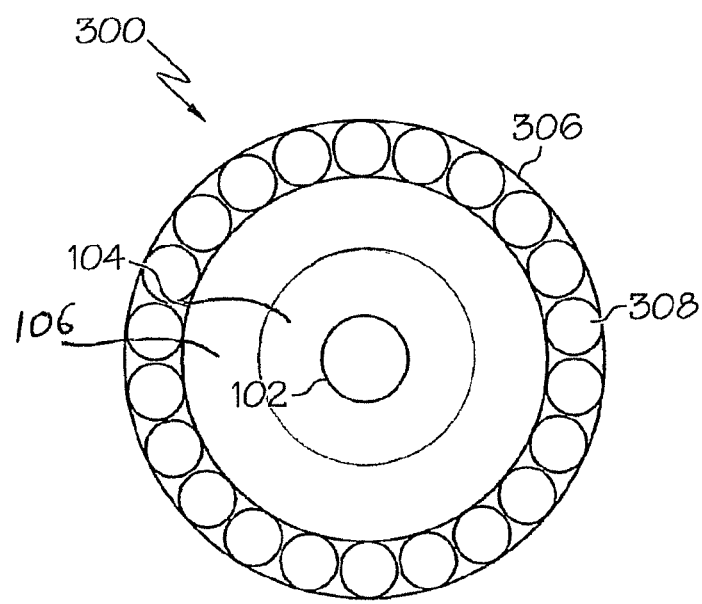
FIG. 3 schematically depicts a cross section of another triple-clad optical fiber comprising a regular distribution (both size and position) of voids in the outer cladding according to one or more embodiments shown and described herein.

Alternatively, the index of refraction $n_3$ of the outer cladding 106 may be decreased by forming the outer cladding such that the outer cladding contains a distribution of voids as is shown in FIGS. 2 and 3 which depict two embodiments of triple-clad optical fibers 200, 300 with outer claddings containing voids. The voids may contain air and/or consolidation gases such that the index of refraction of the voids is less than the index of refraction of the outer cladding. Accordingly, by incorporating voids in the outer cladding, the index of refraction $n_3$ of the outer cladding relative to the inner cladding may be reduced.

A cross section of a triple-clad optical fiber 200 with a void-containing outer cladding 206 is shown in FIG. 2. The void-containing outer cladding 206 comprises a plurality of voids 208 distributed throughout the outer cladding. In one embodiment, the voids may comprise discrete, closed voids formed in the outer cladding when the material of the outer cladding is deposited and consolidated during the manufacture of the optical fiber preform from which the triple-clad optical fiber 200 is drawn. The closed voids may contain consolidation gases which become trapped in the voids during the consolidation process. In the embodiment shown, the voids 208 may be small, e.g., the voids may have diameters smaller than the wavelength of light propagated along the second inner cladding 105 of the triple-clad optical fiber 200. For example, the voids 208 may have diameters of less than about 500 nm, more preferably less than about 300 nm and, most preferably, less than 200 nm. As shown in FIG. 2, the voids may have a random size distribution throughout the outer cladding 206 such that the outer cladding comprises a distribution of voids having different cross sectional areas. When the voids in the outer cladding are small voids, as defined herein, the regional void area percent of the voids may be greater 5% (for example 5% to 60%). For example, greater than about 10%, more preferably greater than about 20% and, most preferably greater than 25%. The regional void area percent of the voids may preferably be less than 60%, for example less than 30%. Regional void area percent, as used herein, means the total area of the voids in a void containing region (e.g., the outer cladding) divided by the total area of the void containing region (when the optical fiber is viewed in cross-section taken perpendicular to the axis of the optical fiber) times 100. In the particular embodiment shown in FIG. 2, the regional void area percent of the outer cladding 206 is on the order of 25%.

In some embodiments, the voids contained in the outer cladding may be either non-periodically disposed, or periodically disposed, or both. "Non-periodically disposed" or "non-periodic distribution," means that, for a particular cross section (such as a cross section perpendicular to the longitudinal axis) of the optical fiber, the non-periodically disposed voids are randomly or non-periodically distributed across the outer cladding. Similar cross sections taken at different points along the length of the fiber will reveal different cross-sectional hole patterns, i.e., various cross sections will have different hole patterns, wherein the distributions of voids and sizes of voids do not match. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. The triple-clad optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a void is the longest line segment whose endpoints are disposed on the silica internal surface defining the void when the optical fiber is viewed in perpendicular cross-section transverse to the longitudinal axis of the fiber.

In the embodiment shown in FIG. 2, the inner cladding 104 and core 102 of the triple-clad optical fiber 200 may be as described hereinabove with respect to the triple-clad optical fiber 100 depicted in FIG. 1. A triple-clad optical fiber having an inner cladding comprising pure silica glass and a void-containing outer cladding having a regional void area percent of approximately 25% air may result in the inner cladding having a numerical aperture of about 0.68.

While the voids 208 shown in FIG. 2 have been described herein as closed, non-periodically distributed voids having a random size distribution, it should be understood that the voids 208 may also be periodically distributed throughout the outer cladding and that the voids may also be of a generally uniform size. Further, the voids may also be open and, as a result, contain air as will be described in more detail herein.

Referring now to FIG. 3, another embodiment of a triple-clad optical fiber 300 with a void-containing outer cladding 306 is shown. In this embodiment, the voids 308 large, e.g., the voids 308 have diameters larger than the wavelength of light propagated along the inner cladding 104 of the triple-clad optical fiber 300. For example, in this embodiment, the large voids 308 may generally have a diameter of greater than 1 μm, more preferably greater than about 5 μm and, most preferably, greater than about 10 μm. When the voids 308 are large, as defined herein, the regional void area percent may be greater than about 80%, more preferably greater than about 90% and, most preferably about 95%. When the voids 308 are large, as defined herein, the regional void area percent may preferably be less than 98%. In the example shown, the regional void area 5 of the outer cladding 306 is on the order of 90% which greatly reduces the overall index of refraction of the outer cladding. When the outer cladding regional void area % is approximately 80% to 90% air and the second inner cladding comprise updoped silica glass the second inner cladding may have a numerical aperture of about 1.

In the embodiment shown in FIG. 3, the voids 308 may be periodically distributed throughout the cross section of the outer cladding. The voids 308 may also generally comprise the same diameter. The voids 308 may be open and, as a result, may contain air. The voids 308 may be formed by drilling holes in the outer cladding region of the optical fiber preform from which the triple-clad optical fiber is drawn. Alternatively, the large voids 308 may be formed using a "stack and draw" method of forming an optical fiber preform. The drilling and stack and draw methods may be used to produce either small voids (e.g., such as described with respect to FIG. 2) or large voids (e.g., such as is described with respect to FIG. 3). However, it should be understood that other techniques for forming open voids in the outer cladding may be used.

In one embodiment, the triple-clad optical fibers of FIGS. 1-3 may be produced by an outside-vapor-deposition (OVD) process. The OVD process is a way of making optical fiber through reactions from specific vapor-phase ingredients (including silica and other dopant precursors) via a hydrolysis process in a $CH_4+O_2$ flame to form silica glass and/or silica glass and dopant soot-particles which are then collected by thermopheretic means onto either a bait rod (for making a core soot-preform) or a glass core cane or rod (for making overclad soot-preform). The soot-preform is subsequently dried and densified into solid glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. In summary, the core and/or cladding preform is generated first, then consolidated, and the final (consolidated) preform is drawn into optical fiber by known fiber-drawing methods.

More specifically, vapor-phase precursor materials that may be used to make the portion of the soot preform associated with the core of the triple-clad optical fiber may be, for example, $SiCl_4$, $GeCl_4$, $AlCl_3$, $TiCl_4$, or $POCl_3$. In some embodiments, the core preform comprises pure silica glass or silica glass doped with $GeO_2$. After the soot is consolidated into the core preform, the OVD process is used to deposit $SiO_2$ containing soot on the consolidated core preform to form a soot preform of the first and second inner cladding layers of the triple-clad optical fiber. The first inner cladding may utilize pure silica soot, or may contain dopants which may decrease the index of refraction of the inner cladding. The second cladding layer may contain dopants which may increase the index of refraction of the second inner cladding. Such dopants may be deposited with the $SiO_2$ soot. For example, when the second inner cladding is up-doped with $GeO_2$, the $GeO_2$ may be deposited with the $SiO_2$ soot. After the soot preform of the first and second inner claddings is deposited on the core preform, the inner claddings' soot preform may be consolidated to form a layer of dense silica glass around the core preform. In some embodiments, the core preform comprises pure silica glass without any updopants (and the first inner cladding is down-doped relative to $SiO_2$).

After the soot preform of the inner cladding is deposited, the soot preform of the outer cladding may be deposited onto the core preform. In one embodiment, as discussed above, the outer cladding comprises silica glass down-doped with fluorine and boron in the form of $B_2O_3$. Accordingly, to deposit the down-doped silica glass layer, $SiO_2$ or $SiO_2$ down doped with $B_2O_3$ may be deposited on the consolidated soot preform of the inner cladding to form a soot preform of the outer cladding. A gas containing F, for example $SiF_4$, may be used in the consolidation process to lower the refractive index of the cladding portion of the preform. As discussed above, the consolidated glass containing B and/or F has a lower refractive index than pure silica.

If boron/fluorine co-doping is employed, boron/fluorine co-doping in silica glass may be accomplished via two steps: (i) boron doping in soot deposition; followed by (ii) fluorine sinter-doping during consolidation.

For example, deposition of the boron-doped $SiO_2$ outer cladding may be performed on a pure silica or doped silica inner claddings which surrounds a pure silica or $GeO_2$ doped silica core rod, using $BCl_3$ and $SiCi_4$ or B- and Si-containing organometallic precursors, as source materials. It is noted that the capture efficiency of boron in laydown increases as OVD burner flame temperature decreases. The preferred temperature range during the laydown step is about 1400° C. to 1600° C. for the target boron oxide content of the soot of 10 wt % to 12 wt %, and suitable soot density (for example less than 0.6 $gm/cm^3$, more preferably less than 0.5 $gm/cm^3$, and even more preferably less than 0.4 $gm/cm^3$) for easier F sinter-doping at the subsequent consolidation step. Such a boron-doped soot made preform usually has high OH content and high stress level, due respectively to the lower temperature hydrolysis process and higher thermal expansion coefficient of the soot composition. To prevent the likelihood of the soot-preform from cracking, a thermal stabilization step is preferred for the soot-preform prior to its F-sinter doping at consolidation. The soot preform is preferably thermally stabilized at 100° C. to 500° C., for example in a 300° C. holding oven under a dry inert gas atmosphere for about 8 hours. In this regard, thermal stabilization may be 3 to 24 (e.g., 10, 12, 16, or 18 hours), with longer thermal stabilization for larger size soot preforms.

The soot preform according to this exemplary embodiment is then consolidated in the furnace with a F compound, for example with $SiF_4$ or $CF_4$. Fluorine (F) sinter-doping into the boron-containing soot-preform, according to an embodiment of this invention, is a single-zone consolidation process. The entire consolidation process occurs in the lower temperature furnace's drying zone region, which is usually situated in the upper part of the standard consolidation furnace. Consolidation is done at relatively low temperatures due to the rather low glass-transition temperature ($T_g$) of the B/F co-doped silica (which is around 800° C., or lower). The exemplary silica soot preform (doped with 10 wt % B) is first $Cl_2$-dried at around 850° C.-900° C. for 45-60 minutes. The dry-zone temperature is then ramped-up to 1200° C. for sinter/F doping for 90 to 150 minutes with $SiF_4$. During sintering and F doping, the boron composition is consolidated glass drops significantly, such as from 10 wt % in the soot phase to 4-8 wt % in the fully consolidated glass phase. Such a reduction is caused by etch out of boron in the presence of fluorine. As a result, the boron and fluorine concentration in glass may be in the range of 4-8 wt % and 1.5-2.5 wt %, respectively. After the consolidation process, the consolidated preform is cooled down and taken to fiber draw.

In another embodiment, the outer cladding 106 of the triple-clad optical fiber may comprise a void-containing outer cladding instead of an outer cladding comprising B and/or F dopants. The voids in the void-containing outer cladding may lower the index of refraction of the outer cladding. In one embodiment, in order to produce the void-containing outer cladding, $SiO_2$ soot may be deposited on the consolidated soot preform of the second inner cladding. The $SiO_2$ soot is deposited and consolidated under conditions which are effective to trap a portion of the consolidation gases in the consolidated glass thereby producing an array of closed voids in the outer cladding region of the optical fiber preform from which the triple-clad optical fiber is drawn. For example, the outer cladding 106 may be consolidated in a gaseous atmosphere under conditions which cause a portion of the gaseous atmosphere to become trapped in the voids as the voids are closed. The gaseous atmosphere may comprise a gas which lowers the index of refraction, such as nitrogen or krypton. However, it will be understood that other consolidations gases which lower the index of refraction of the glass may be used such as, for example, nitrogen, argon, carbon dioxide, oxygen, $CF_4$, chlorine, CO, $C_2F_6$, $SO_2$, Kr, Xe, Ne and mixtures thereof, but not air. In some embodiments, the method used to create the void-containing outer cladding 106 may be similar to the methods disclosed in U.S. patent application Ser. No. 12/151,170, filed May 5, 2008 and entitled "MICROSTRUCTURED OPTICAL FIBERS AND METHODS", although other methods for forming a void-containing outer cladding may be used.

Figure 4:
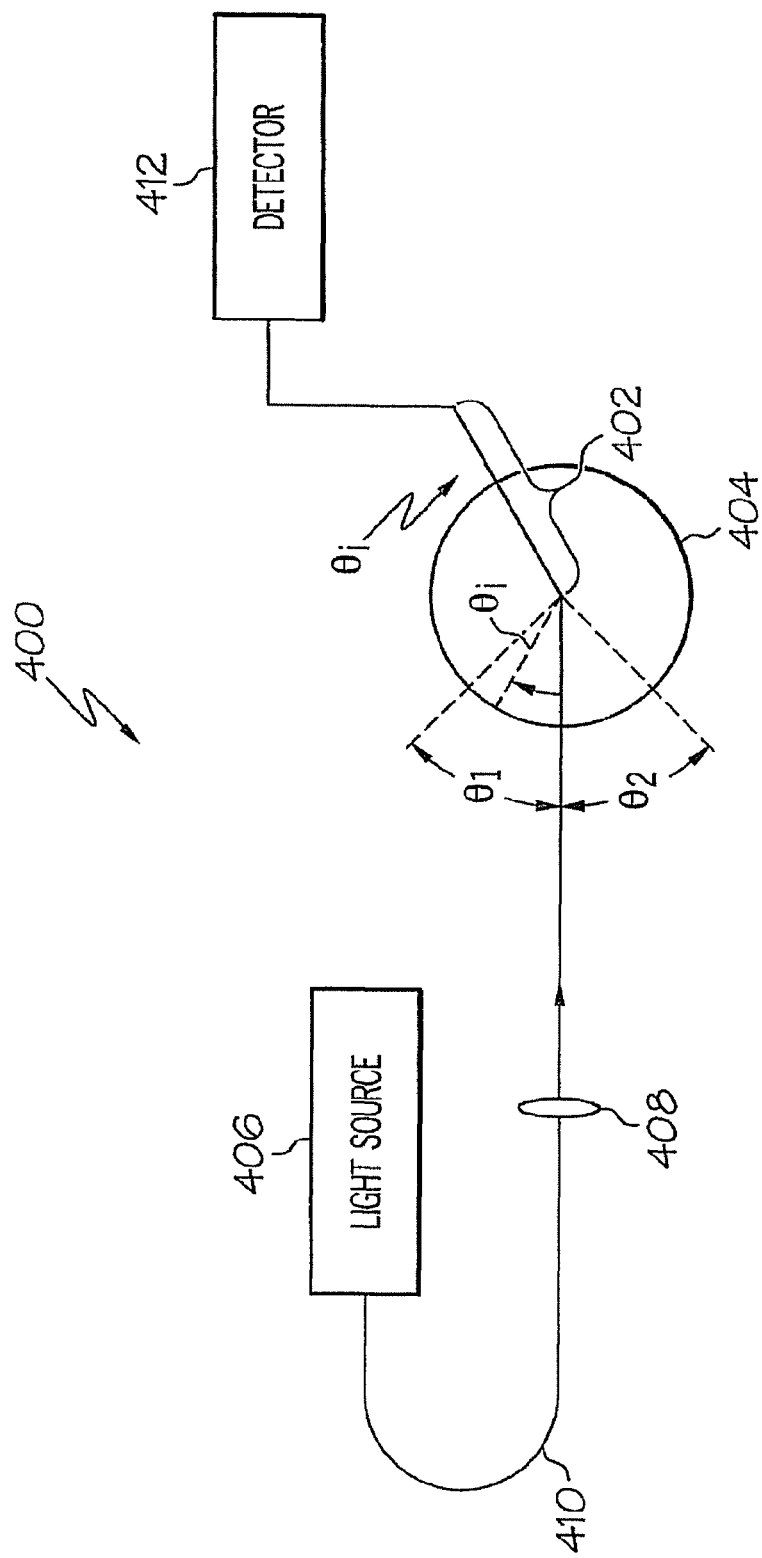
FIG. 4 illustrates a test apparatus for measuring the numerical aperture of an optical fiber.

As discussed hereinabove, the numerical aperture of the inner claddings may be mathematically calculated. However, under certain circumstances, it may be necessary to experimentally determine the combined numerical aperture of the inner claddings. For example, in some situations, the index of refraction of one of the two inner claddings may not be precisely known. Under such circumstances the combined numerical aperture of the two inner claddings of the triple-clad optical fibers described herein may be measured using an angular measurement technique similar to that described in the article entitled "Propagation losses of pump light in rectangular triple-clad fibers" by Anping Lu and Kenichi Ueda, 3134 Optical Engineering, Vol. 35 No. 11, November 1996. An exemplary device for performing a similar measurement technique is schematically shown in FIG. 4. The device generally comprises a light source 406, a rotatable stage 404 and an optical detector 412. The light source 404 may generally comprise a broadband light source with a particular center wavelength. For example, different broadband light sources may be selected to obtain different center wavelengths. Of particular interest are light sources having center wavelengths corresponding to typical operating wavelengths for the triple-clad optical fibers and endoscopes employing the same. Accordingly, the broadband light source may have a center wavelength of 850 nm, 1060 nm, 1310 nm or 1550 nm.

To measure the numerical aperture of the inner claddings, the triple-clad test fiber 402 is positioned on the rotatable stage 404 such that the angular orientation of the triple-clad test fiber 402 may be precisely controlled with respect to the light from the light source. The output of the light source 404 is coupled into a cleaved end of the triple-clad test fiber 402 with a coupling fiber 410 and a collimating lens 408. Specifically, the output of the light source 404 is simultaneously coupled into both inner claddings of the triple-clad test fiber 402. Light coupled into the inner claddings of the triple-clad test fiber 402 is substantially collimated after passing through the collimating lens. The opposite end of the triple-clad test fiber 402 is coupled to the optical detector 412 such that the power of the light coupled through the triple-clad test fiber 402 may be measured.

The triple-clad test fiber 402 is rotated through a range of input angles $\theta_i$ such that the angular orientation of the triple-clad test fiber 402 is adjusted relative to the light from the light source 404. As the triple-clad test fiber 402 is rotated, the power of the light coupled through the inner claddings of the optical test fiber 402 is measured as a function of the input angle $\theta_i$ of the light from the light source 406. The combined numerical aperture of the inner claddings of the triple-clad test fiber can be calculated for the specific wavelength of light from the light source using the half angle $$\left(\text{e.g., } \frac{|\theta_1 - \theta_2|}{2}\right).$$

In order to perform this calculation, a threshold level is set to first determine $\theta_1$ and $\theta_2$. For example, the threshold level may be set at 2.5% or 5% of the peak power of the light coupled through the inner cladding of the triple-clad test fiber 402. Accordingly, $\theta_1$, and/or $\theta_2$ may be determined by rotating the triple-clad test fiber 402 until the power of the light coupled through the two inner claddings of the triple-clad test fiber is 2.5% (or 5%) of the peak or maximum power coupled through the fiber. $\theta_1$ and $\theta_2$ are determined from the angular orientation of the triple-clad test fiber relative to the output of the light source. For a particular threshold power level, the numerical aperture of the inner cladding may be calculated using the equation:

$$NA = \sin\left(\frac{\theta_1 - \theta_2}{2}\right)$$

The combined numerical aperture NA of the inner claddings may be measured for several different wavelengths. However, in general, the combined numerical aperture is only slightly dependent on the wavelength of light coupled through the optical fiber. The measurement device shown in FIG. 4 may be used in conjunction with the mathematical expression above to determine the combined numerical aperture of the two inner claddings.

EXAMPLES

Measured Fiber Examples

The combined numerical apertures of the two inner claddings (relative to the outer cladding) of the three fiber examples (fibers A, B, and C) listed in Table 1 were experimentally determined using the above-mentioned technique(s). The numerical apertures reported in Table 1 are the overall numerical apertures of the two inner claddings. The triple-clad optical fibers were made using the outside vapor deposition (OVD) process described herein. The core 102 of all three triple-clad optical fibers (fibers A, B, and C) comprised pure silica glass while the first inner cladding 104 comprised silica glass doped with 1.2% of fluorine to lower the index of refraction of the first inner cladding (relative to pure silica). The second inner cladding 105 comprised of pure silica glass. Thus, in these fibers $n_0=n_2$ and $n_1<n_2$. In these exemplary fiber embodiments the fiber core contains no rare earth dopants and no Al or F. The outer cladding 106 comprised silica glass doped with 2 wt. % F and 5 wt. % $B_2O_3$ to lower the index of refraction of the outer cladding relative to the inner claddings. In Table 1, the core radius ($r_0$), first inner cladding radius ($r_1$), second inner cladding radius ($r_2$) and outer cladding radius ($r_3$) are listed for each of the three exemplary fibers. The combined numerical apertures of inner claddings of the triple-clad optical fibers described in Table 1 were measured to be greater than 0.29 at a 5% intensity threshold. The measured core fiber cutoff wavelengths for the three exemplary triple-clad optical fibers (i.e., fibers A, B and C) were below 800 nm, 850 and 1060 nm, respectively. The relative refractive index percent ($\Delta\%$) of the core relative to the cladding (e.g., $\Delta_1\%$) was determined to be 0.34%.

TABLE 1

| Fiber Example | $r_0$ (μm) | $r_1$ (μm) | $r_2$ (μm) | $r_3$ (μm) | $\Delta_1$ % | Core fiber Cutoff (nm) | Combined NA of inner claddings |
|---|---|---|---|---|---|---|---|
| A | 2.2 | 22.5 | 186 | 200 | 0.34 | 672 | 0.337 |
| B | 2.7 | 28.2 | 220 | 250 | 0.34 | 840 | 0.297 |
| C | 3.3 | 34.5 | 266 | 300 | 0.34 | 1030 | 0.302 |

Other Examples

Ten modeled exemplary fibers with the triple clad structure shown in FIGS. 1A and 1B include a core 102, a first inner cladding 104, a second inner cladding 105 and the outer cladding 106. In these exemplary fibers the cores 102 are ether pure silica, silica based glass doped with an index raising dopant such Ge or Al. The first inner clad 104 has a refractive index $n_1<n_0$ and is made of pure silica glass, or glass doped with an index decreasing dopant such as F, or B. The typical relative index delta $\Delta_0$ of core relative to to the first inner cladding in the exemplary modeled embodiments is in the range of 0.1-2%. The core radius $r_0$ is, for example, in the range of 2-5 μm. In these embodiments the outer radius of the first inner cladding $r_1$ is greater than 5 times of the core radius $r_0$ to advantageously provide low tunneling loss of the light guided in the core. In these embodiments the refractive index delta of the first inner cladding relative to the outer cladding $\Delta_1$ is between 0.5 to 1.5%. The second inner cladding 105 has a refractive index of $n_2>n_1$. In these exemplary embodiments it is made of pure silica glass or of glass doped with an index raising dopant, such as Ge, Al, or Ti. In these exemplary embodiments the outer cladding 106 has a refractive index $n_3<n_2$. In the first eight fiber examples in Tables 2A and 2B the outer cladding 106 is made of glass doped with an index decreasing dopant such as B, F, or both. In examples 9 and 10 the outer cladding includes gas-filled voids. The relative index change of the second inner cladding relative to the outer cladding, $\Delta_2$ is greater than 1.5%, which corresponds to a NA of greater than 0.25. The typical thickness of the total inner cladding (first+second inner claddings) of these exemplary fiber embodiments is between 25-500 μm. The thickness of the outer cladding is between 10-50 μm.

Tables 2A and 2B show exemplary triple-clad optical fiber compositions and the corresponding optical properties. Each of these exemplary optical fibers have core, a first inner cladding a second inner cladding and an outer cladding, all comprising silica-based glass. It is noted that preferably, as shown in Fiber examples 1-4 and 6-8 of Tables 2A and 2B, the fiber cores include no Al, and therefore the exemplary fibers of Table 2A exhibit very low scattering loss and low attenuation of less than 1 dB/km at the operating wavelength range of 1060 nm to 1700 nm. (In a comparative fiber example with $Yb_2O_3$ as well as $Al_2O_3$ and $GeO_2$ present in the core, attenuation is greater than 20 dB/km in the wavelength ranging of 1120 nm-1700 nm, and greater than 100 dB/km below the 1100 nm wavelength). In some embodiments, the absolute value of the chromatic dispersion of the core is less than about 120 ps/nm/km for an operating wavelength of about 800-1600 nm. In some embodiments, the absolute value of the chromatic dispersion of the core is less than about 18 ps/nm/km for an operating wavelength of about 1310-1550 nm.

The core delta and core radius can be adjusted to change the core cutoff wavelength, mode filed diameter, and dispersion. Examples 1-3 have a core delta of 0.34, 0.26, and 0.2, respectively, and a core radius $r_0$ of 2.50 μm, 2.86 μm and 3.30 μm respectively. The optical fibers of Examples 1-3 are single-moded at the operating wavelength of 800 nm. The mode filed diameter (MFD) of fibers Examples 1-3 is 5.5 μm, 6.3 μm, and 7.2 μm, respectively.

In Example 1, the fiber core 102 is pure silica. The first cladding 104 is doped with 1.2% F. The refractive index delta $\Delta_0$ of the core 102 is 0.34% (relative to the first inner cladding 104). The core radius is 2.5 μm, and the fiber core has a cutoff wavelength at 779 nm. The fiber core is single moded at the operating wavelength of 800 nm. The second inner cladding 105 is pure silica. Thus, $n_0=n_2$. The outer cladding 106 is doped with 2% F and 5% of $B_2O_3$ to lower the refractive index relative to pure silica. Relative to the outer cladding, the first and second claddings 104, 105 have an index delta of 1.76% and 2.1%, respectively, which correspond to a NA value of 0.27 and 0.3, respectively. The fiber has an outer cladding radius $r_3$ of 62.5 μm such that the triple-clad optical fiber of Example 1 is a standard 125 μm diameter optical fiber.

In Example 2, the fiber core 102 is pure silica. The first cladding 104 is doped with 0.94% F. The refractive index delta $\Delta_0$ of the core 102 is 0.26% (relative to the first inner cladding 104). The core radius is 2.86 μm, and the fiber core has a cutoff wavelength at 781 nm. The second inner cladding 105 is doped with be doped with $GeO_2$ to increase its refractive index. The outer cladding 106 is doped with 2.5% F to lower its refractive index relative to pure silica. In this fiber example, the second inner cladding 105 is doped with 32.5 of $GeO_2$, which makes the NA of 0.34 relative to the F doped outer cladding. Relative to the outer cladding, the first and second claddings 104, 105 have an index delta of 0.44% and 2.7%.

In Example 3, the fiber core 102 is pure silica. The first cladding 104 is doped with 0.72% F. The refractive index delta $\Delta_0$ of the core 102 is 0.2% (relative to the first inner cladding 104). The core radius is 3.3 µm. The second inner cladding 105 is doped with be doped with 32.5 wt % $GeO_2$ to increase its refractive index. The outer cladding 106 is co-doped with F and $B_2O_3$ to lower its refractive index relative to pure silica. Relative to the outer cladding, the first and second claddings 104, 105 have an index delta of 1.9% and 4.1% and NAs of 0.29 and 0.42, respectively.

In Example 4 fiber the core is doped with 5.5% $GeO_2$ to increase its refractive index. The second inner cladding 105 is doped with $Al_2O_3$ to increase its refractive index. More specifically, in Example 4, the second inner cladding 105 is doped with 14% of $Al_2O_3$, which makes the NA of the second inner cladding 0.36 relative to the F and $B_2O_3$ co-doped outer cladding.

In Examples 1-4, the mode field diameter is at least 5.5 µm. For some applications, higher core NA and smaller MFD may be desirable. In Example 5 fiber, the core NA is increased to 0.15% by doping the core with 7% of $Al_2O_3$. The MFD of the core 102 is reduced to 4.5 µm, relative to MFDs of fiber examples 1-4.

While standard fiber radius (outer cladding radius) of 62.5 µm is preferred for some applications, for certain applications larger fiber radius can increase further the capture efficiency of the signal for some applications. In Examples 4-5, the radius $r_3$ is increased to 125 µm and 200 µm respectively, and the second inner cladding radius $r_2$ is 110 µm and 180 µm, respectively.

In Examples 1-5, the operating wavelength is 800 nm. Other operating wavelengths can also be used for nonlinear optical endoscope applications. The fiber in Example 6 is designed for the operating wavelength of 1060 nm. The core is designed to have a cutoff of 1021 nm, which makes the fiber single moded at 1060 nm. One advantage of the fiber is that it has lower chromatic dispersion at 1060 nm than the fibers in Examples 1-5 at 800 nm. The dispersion value is reduced from −116 to −34.9 ps/nm/km.

If lower dispersion is required, one can use a 1310 nm operating wavelength, where the material dispersion is lower. Example 7 is a fiber with single mode core that has a core cutoff wavelength of 1295 nm. The fiber chromatic dispersion of this exemplary fiber is nearly zero at the 1310 nm operating wavelength. If this fiber is used at a 1550 nm wavelength, the dispersion is positive with a value about 17 ps/nm/km.

It is noted that the triple-clad fibers 100 can be also designed with zero dispersion at any other wavelength between 1300 and 1600 nm by changing the core delta and reducing the core size. Example 8 fiber has a core delta of 1.2% and a core radius of 2.28 µm. The fiber has nearly zero dispersion at 1550 nm.

TABLE 2A

|  | Example 1 | Example 2 | Example 3 | Example 4 | Example 5 |
|---|---|---|---|---|---|
| Core dopant | none | none | none | 5.5% $GeO_2$ | 7% $Al_2O_3$ |
| $1^{st}$ inner clad dopant | 1.2% F | 0.94% F | 0.72% F | none | none |
| $2^{nd}$ inner clad dopant | none | 32.5% $GeO_2$ | 32.5% $GeO_2$ | 14% $Al_2O_3$ | 9.9% $TiO_2$ |
| Outer clad dopant | 2% F, 5% $B_2O_3$ | 2.5% F | 2% F, 5% $B_2O_3$ | 2% F, 5% $B_2O_3$ | 2% F, 5% $B_2O_3$ |
| $\Delta_0$ | 0.34% | 0.26% | 0.20% | 0.34% | 0.50% |
| $\Delta_1$ | 1.76% | 0.44% | 1.9% | 2.1% | 2.1% |
| $\Delta_2$ | 2.1% | 2.7% | 4.1% | 3.1% | 5.1% |
| Core NA | 0.12 | 0.10 | 0.09 | 0.12 | 0.15 |
| $1^{st}$ inner clad NA | 0.27 | 0.14 | 0.29 | 0.30 | 0.30 |
| $2^{nd}$ inner clad NA | 0.30 | 0.34 | 0.42 | 0.36 | 0.46 |
| $r_0$ (µm) | 2.50 | 2.86 | 3.30 | 2.50 | 1.98 |
| $r_1$ (µm) | 13.8 | 17.2 | 23.1 | 20 | 15 |
| $r_2$ (µm) | 47.5 | 47.5 | 47.5 | 110 | 180 |
| $r_3$ (µm) | 62.5 | 62.5 | 62.5 | 125 | 200 |
| Core cutoff wavelength (nm) | 779 | 781 | 788 | 779 | 775 |
| Core MFD (µm) | 5.5 (@800 nm) | 6.3 (@800 nm) | 7.2 (@800 nm) | 5.5 (@800 nm) | 4.5 (@800 nm) |
| Dispersion (ps/nm/km) | −116 (@800 nm) | −114 (@800 nm) | −112 (@800 nm) | −116 (@800 nm) | −121 (@800 nm) |

TABLE 2B

|  | Example 6 | Example 7 | Example 8 | Example 9 | Example 10 |
|---|---|---|---|---|---|
| Core dopant | 5.5% $GeO_2$ | 5.5% $GeO_2$ | 19.5% $GeO_2$ | None | none |
| $1^{st}$ inner clad dopant | none | none | none | 1.2% F | 1.2% F |
| $2^{nd}$ inner clad dopant | 14% $Al_2O_3$ | 14% $Al_2O_3$ | 14% $Al_2O_3$ | None | none |
| Outer clad dopant | 2% F, 5% $B_2O_3$ | 2% F, 5% $B_2O_3$ | 2% F, 5% $B_2O_3$ | 25% void | 90% void |
| $\Delta_0$ | 0.34% | 0.34% | 1.2% | 0.34% | 0.34% |
| $\Delta_1$ | 2.1% | 2.1% | 2.1% | 11.4% | 29.7% |
| $\Delta_2$ | 3.1% | 3.1% | 3.1% | 11.7% | 30% |
| Core NA | 0.12 | 0.12 | 0.22 | 0.12 | 0.12 |
| $1^{st}$ inner clad NA | 0.30 | 0.30 | 0.30 | 0.67 | 1 |
| $2^{nd}$ inner clad NA | 0.36 | 0.36 | 0.36 | 0.68 | 1 |
| $r_0$ (µm) | 3.22 | 4.01 | 2.28 | 4.01 | 4.01 |
| $r_1$ (µm) | 19.3 | 32.1 | 22.8 | 32.1 | 32.1 |
| $r_2$ (µm) | 47.5 | 47.5 | 47.5 | 47.5 | 47.5 |

TABLE 2B-continued

|  | Example 6 | Example 7 | Example 8 | Example 9 | Example 10 |
|---|---|---|---|---|---|
| $r_3$ (μm) | 62.5 | 62.5 | 62.5 | 62.5 | 62.5 |
| Core cutoff wavelength (nm) | 1021 | 1295 | 1240 | 1295 | 1295 |
| Core MFD (μm) | 7.28 (@1060 nm) | 9.09 (@1310 nm) | 5.44 (@1550 nm) | 9.09 (@1310 nm) | 9.09 (@1310 nm) |
| Dispersion (ps/nm/km) | −34.9 (@1060 nm) | −0.03 (@1310 nm) | −0.04 (@1550 nm) | −0.03 (@1310 nm) | −0.03 (@1310 nm) |

As discussed hereinabove, one alternate method of increasing the numerical aperture of the inner cladding is to decrease the index of refraction of the outer cladding by forming a void-containing outer cladding with a distribution of voids throughout the outer cladding. Fibers 9 and 10 are two exemplary compositions of triple-clad optical fibers having a void-containing outer cladding comprising voids.

Fiber 9 has a void-containing outer cladding comprising a distribution of small, closed voids containing trapped gas such that the regional void area of the outer cladding is about 25%. This lowers the index of refraction of the outer cladding and, as a result, the relative refractive index percent ($\Delta_2$%) of the second inner cladding to the outer cladding is increased to 11.7% and the numerical aperture of the second inner cladding is increased to 0.68. Moreover, the fiber is designed to operate at a wavelength of 1310 nm (e.g., the core of the fiber has a radius $r_0$ of 4.01, the same as Example 7). As such, the triple-clad optical fiber of example 9 also has near-zero dispersion at the operating wavelength.

In Fiber 10 the void-containing outer cladding comprises a distribution of large, open voids containing air such that the regional void area of the outer cladding comprises 90% air. This lowers the index of refraction of the outer cladding and, as a result, the relative refractive index percent ($\Delta_2$%) of the second inner cladding relative to the outer cladding is increased to 30% and the numerical aperture of the second inner cladding is increased to 1.0. As with Fiber 9, the fiber is designed to operate at a wavelength of 1310 nm such that the triple-clad optical fiber has near-zero dispersion at the operating wavelength.

Figure 5:
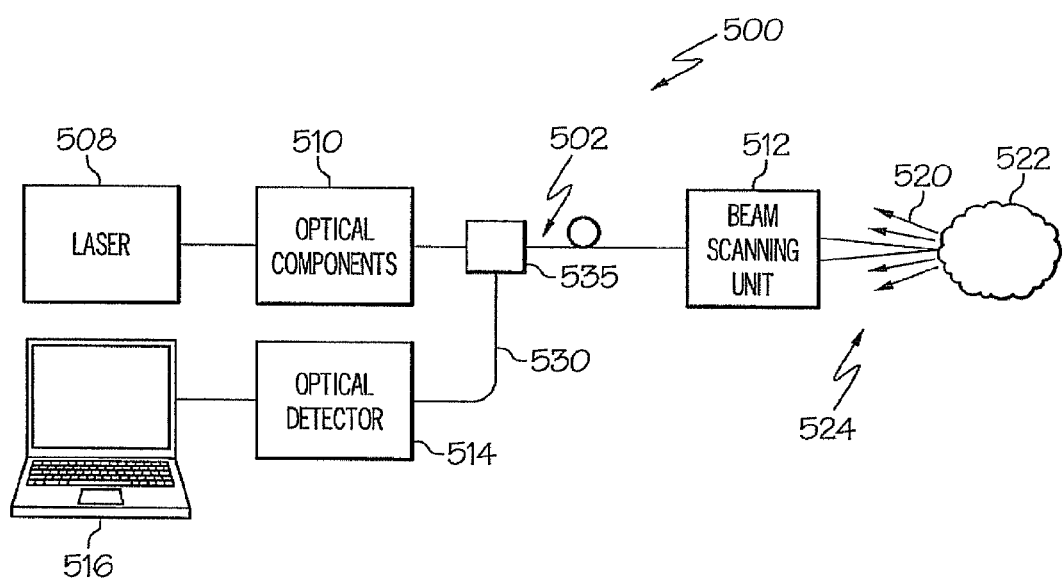
FIG. 5 is a schematic diagram of a non-linear optical endoscope device utilizing an optical fiber according to one or more embodiments shown and described herein.

FIG. 5 shows a schematic of an optical nonlinear endoscope. A short pulse (pump) laser is coupled into the core of a triple-clad fiber using optical components. The fiber core is preferably single mode at the pump wavelength to ensure a good beam quality. The laser beam is delivered to the target though the fiber core. A beam scanning unit scans the laser beam across a two dimensional area on the target. The laser beam interacts with the target through the two photon absorption process and the signal produced is collected back through both of the fiber' inner claddings to an optical detector. Thus, thee pump light is guided in the core and delivered to the target, while the optical signal after interaction with the target is collected by the inner claddings. The inner claddings preferably have a high numerical apertures and large dimension to enable a high capture efficiency of the signal. The high NA of the second inner cladding advantageously provides high capture efficiency of signal back to detector. The single is analyzed by a computer to form an image.

FIG. 5 is a schematic illustration of an exemplary non-linear optical endoscope 500. The relatively high numerical aperture of the inner claddings of the triple-clad optical fibers shown and described herein make such fibers particularly well suited for use in conjunction with such non-linear optical endoscopes, particularly when the endoscopes use a two-photon or multi-photon fluorescence process to generate an image or spectrum from the target material. The non-linear optical endoscope 500 generally comprises a light source 508, a triple-clad optical fiber 502 comprising a core 504, two inner claddings and an outer cladding as described herein, a beam scanning unit 512 and an optical detector 514.

The core in the triple clad design is preferably made pure silica glass or glass doped with minimum dopant level, which reduces linear and nonlinear fluorescence, thus reducing the back ground noise. The second inner cladding has a high numerical aperture, which allows high collection efficiency of the signal. In addition, the fiber structures are compatible with conventional fiber making process such as OVD and are easy to make with low costs.

The light source 508 may comprise a laser source such as a short-pulse laser source. The output of the light source 508 may be coupled into the core of the triple-clad optical fiber 502 with optical components 510 at a first end of the triple-clad optical fiber. The optical components may include lenses, collimating lenses, mirrors and the like. The triple-clad optical fiber may pass through an optical coupler 535 which optically couples both inner claddings of the triple-clad optical fiber 502 to an optical detector 514 as will be discussed further herein. A beam scanning unit 512 may be coupled to the triple-clad optical fiber 502 at a second end of the triple-clad optical fiber 502.

The beam scanning unit 512 may be operable to position the triple-clad optical fiber 502 in two directions such that the output of the light source 508 may be scanned across a target 522. In one embodiment, the beam scanning unit 512 comprises a piezoelectric actuator which is operable to position the triple-clad optical fiber 502 in two directions and thereby achieve a desired scanning pattern of the output of the light source 508 over the target 522. The non-linear optical endoscope 500 may also comprise one or more lenses (not shown) disposed in the beam scanning unit 512 such that the output of the light source exiting the triple-clad optical fiber 502 passes through the lenses and is focused on the target 522. The lens may also serve to focus light emitted from the target into the first and the second inner cladding of the triple-clad optical fiber 502. In one embodiment, lenses for focusing the output of the light source exiting the triple-clad optical fiber 502 may be disposed between the beam scanning unit 512 and the target 522.

The optical detector 514 may be optically coupled to the first and to the second inner claddings of the triple-clad optical fiber via the optical coupler 535 such that optical signals propagating along the two inner cladding, specifically optical signals emitted from the target and collected into the two inner claddings, are received by the optical detector. A transmission fiber 530 connects the optical coupler 535 to the optical detector 514. More specifically, the optical coupler 535 couples the light propagating in the inner claddings of the triple-clad optical fiber 502 to the transmission fiber 530 which transmits the light to the optical detector. In one embodiment, the optical detector responds to the optical signals propagating along the inner claddings and produces a corresponding electrical output signal to a computer 516 programmed to form an image based on the received output signal or otherwise analyze the output signal received from the optical detector. In another embodiment, the optical detector 514 may comprise a spectrometer and/or an imaging device that produces an output signal indicative of spectroscopic information derived from the optical signal propagating along the inner claddings. In either embodiment, the output of the optical detector may be used for determining the characteristics of the target, e.g., for creating an image of the target based upon light emitted from the target or producing a spectrogram indicative of the intensity of different wavelengths emitted from the target as a result of fluorescence processes.

In operation, the light source 508 (e.g., the laser) of the non-linear optical endoscope produces a light pulse which is coupled in to the core 504 of the triple-clad optical fiber 502 using the optical elements 504. The light pulse is propagated along the triple-clad optical fiber 502 and exits the second end of the triple-clad optical fiber proximate the beam scanning unit 512. The beam scanning unit 512 may be used to position the triple-clad optical fiber 502 such that the light pulse exiting the triple-clad optical fiber is scanned along the target 522. When a light pulse exits the triple-clad optical fiber and is incident on the target, the target may fluoresce and emit an optical signal 520. The optical signal 520 emitted by the target 522 is collected back into the triple-clad optical fiber, specifically into the two inner claddings of the triple-clad optical fiber 502. Due to the large numerical aperture (e.g., NA>0.25) of the second inner cladding, the triple-clad optical fiber is able to collect optical signals 520 with large divergence angles and, as such, improve the optical signal collection efficiency of the triple-clad optical fiber.

After the optical signal 520 emitted by the target is collected into the two inner claddings, the optical signal is propagated back along the triple-clad optical fiber 502 in the inner claddings where it is diverted to the optical detector 514 by the optical coupler 535 with the transmission fiber 530. The optical detector 514 converts the optical signal 520 into an electronic signal which may be used to further analyze and/or image the target.

It should now be understood that the various embodiments and compositions of triple-clad optical fibers shown and described herein may yield triple-clad optical fibers having numerical apertures greater than about 0.25. Moreover, certain embodiments and compositions of triple-clad optical fibers shown and described herein may yield triple-clad optical fibers having low chromatic dispersion in addition to having numerical apertures greater than about 0.25.

It should also be understood that the optical properties of the triple-clad optical fibers shown and described herein, specifically the large numerical aperture of the inner cladding of the triple-clad optical fibers, make the triple-clad optical properties well suited for incorporation into optical endoscopes, particularly non-linear optical endoscopes which utilize a two photon or multi-photon process to image and/or analyze a target. In particular, the use of triple-clad optical fibers as shown and described herein may improve the optical signal collection efficiency of non-linear optical endoscopes and, as a result, improve the quality of images produced by the non-linear optical endoscopes as well as the quality of data derived from the optical signals collected by the non-linear optical endoscopes. One of the advantages of at least some of the embodiments of the optical fibers described herein is that fiber core can have relatively low up-dopant levels (or be made of pure silica), but the fiber will still have high collection efficiency in the inner claddings.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A triple-clad optical fiber comprising: a core, a first inner cladding, a second inner cladding, and an outer cladding wherein,
the core comprises a radius of less than about 5 μm, a first index of refraction $n_0$ and does not contain any rare-earth dopants;
the first inner cladding surrounds the core and comprises a radial thickness of at least 10 μm, a numerical aperture of at least about 0.12, and a second index of refraction $n_1$ such that $n_1<n_0$, wherein a relative refractive index percent($\Delta\%$) of the core relative to the inner cladding is greater than about 0.07%;
the second inner cladding surrounds the first inner cladding and comprises a radial thickness of at least 8 μm, a numerical aperture of at least about 0.20, and a second index of refraction , wherein a relative refractive index percent ($\Delta\%$) of the second cladding relative to the outer cladding is greater than 1%;
the outer cladding surrounds the second inner cladding and comprises a radial thickness of at least 10 μm and a third index of refraction $n_3$ such that $n_3<n_2$, and $n_3<n_1$.

2. The fiber of claim 1, wherein the core, the first inner cladding, the second inner cladding and the outer cladding are formed from silica-based glass, wherein said fiber has attenuation of less than 1 dB/km at the wavelength range of 1060 to 1700 nm.

3. The triple-clad optical fiber of claim 1 wherein the numerical aperture NA of the core is from about 0.08 to about 0.2.

4. The triple-clad optical fiber according to claim 1, wherein the first inner cladding comprises pure silica glass or silica doped with F, and the outer cladding is co-doped with boron and fluorine.

5. The triple-clad optical fiber of claim 1 wherein the core is made essentially of a pure silica core.

6. The triple-clad optical fiber of claims 1 wherein:
the second inner cladding comprises a dopant such that the relative refractive index percent ($\Delta\%$) of the second inner cladding to the outer cladding is greater than about 3%;
the core comprises a dopant such that the relative refractive index percent ($\Delta\%$) of the core relative to the inner cladding is at least 0.2%; and
the outer cladding comprises less than about 5.0 wt. % fluorine and less than about 10 wt. % boron in the form of $B_2O_3$.

7. The triple-clad optical fiber of claim 6 wherein the second inner cladding comprises from about 5.5 wt. % to about 35 wt. % $GeO_2$.

8. The triple-clad optical fiber of claim 6 wherein the second inner cladding comprises from about 0 wt. % to about 18 wt. % of $TiO_2$, or $Al_2O_3$.

9. The triple-clad optical fiber according to claim 1, wherein the outer cladding comprises a distribution of voids which decrease the index of refraction of the outer cladding $n_3$ relative to the index of refraction of the inner cladding $n_2$.

10. The triple-clad optical fiber of claim 9 wherein the voids are less than about 500 nm in diameter and the regional void area percent of the outer cladding is from about 5% to about 30%.

11. The triple-clad optical fiber of claim 9 wherein the voids are greater than about 1μm in diameter and the regional void area percent of the outer cladding is from about 80% to about 95%.

12. The triple-clad optical fiber according to claim 1, wherein the absolute value of the chromatic dispersion of the core is less than about 120 ps/nm/km for an operating wavelength of about 800-1600 nm.

13. The triple-clad optical fiber of claim 1 wherein the absolute value of the chromatic dispersion of the core is less than about 18 ps/nm/km for an operating wavelength of about 1310-1550 nm.

14. An optical endoscope comprising a laser source, a triple-clad of claim 2, a beam scanning unit, an optical detector and a computer, wherein:
    the triple-clad optical fiber comprises a core, first and second inner claddings and an outer cladding wherein:
    an output of the laser source is optically coupled to the core of the triple-clad optical fiber at a first end of the triple-clad optical fiber such that the output of the laser source is directed into the core of the triple-clad optical fiber;
    the optical detector is coupled to the first and second inner claddings of the optical fiber at the first end of the triple-clad optical fiber and is operable to convert light traveling through the inner cladding into electrical signals;
    the computer is electrically coupled to the optical detector and operable to form an image from electrical signals received by the optical detector; and
    the beam scanning unit is optically coupled to a second end of the triple-clad optical fiber, wherein the beam scanning unit is operable to scan the output of the laser source directed into the core of the triple-clad optical fiber across a target in two dimensions and collect light emitted from the target into the first and second inner claddings of the optical fiber.

15. The triple-clad optical fiber according to claim 1, wherein the effective area of the core is >30 μm² and ≦100 μm².

16. The triple-clad according to claim 1, wherein said core is a single mode core at the operating wavelength.

17. The triple-clad optical fiber of claim 1, wherein $n_2 \geq n_0$.

* * * * *